(12) United States Patent
Rizzini

(10) Patent No.: US 10,210,582 B2
(45) Date of Patent: Feb. 19, 2019

(54) METHOD AND SYSTEM FOR PLATFORM DATA UPDATING BASED ON ELECTRONIC TRANSACTION PRODUCT DATA

(71) Applicant: MasterCard International Incorporated, Purchase, NY (US)

(72) Inventor: Andrea Rizzini, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 532 days.

(21) Appl. No.: 14/958,087

(22) Filed: Dec. 3, 2015

(65) Prior Publication Data

US 2017/0161843 A1 Jun. 8, 2017

(51) Int. Cl.
*G06Q 40/00* (2012.01)

(52) U.S. Cl.
CPC .................... *G06Q 40/12* (2013.12)

(58) Field of Classification Search
USPC .......................................................... 705/30
See application file for complete search history.

(56) References Cited

U.S. PATENT DOCUMENTS

| | | | | | |
|---|---|---|---|---|---|
| 5,412,564 A | * | 5/1995 | Ecer | .................... | G06F 19/3475 600/300 |
| 5,965,860 A | * | 10/1999 | Oneda | .................... | G06Q 30/02 235/375 |
| 6,038,546 A | * | 3/2000 | Ferro | .................... | G06Q 30/06 705/15 |
| 6,073,841 A | * | 6/2000 | Walton | .................... | G06Q 10/10 235/375 |
| 6,387,049 B1 | * | 5/2002 | Moore | .................... | A47G 19/2227 600/300 |
| 6,611,881 B1 | * | 8/2003 | Gottfurcht | .................... | G06Q 20/105 705/41 |
| 6,769,609 B2 | * | 8/2004 | Ono | .................... | G06K 17/0022 235/375 |
| 6,990,683 B2 | * | 1/2006 | Itabashi | .................... | G06F 17/30864 705/16 |
| 7,412,511 B2 | * | 8/2008 | Curry | .................... | G06Q 30/02 709/219 |
| 7,949,580 B1 | * | 5/2011 | Boyer | .................... | G06Q 20/02 705/35 |

(Continued)

*Primary Examiner* — Ashford S Hayles
(74) *Attorney, Agent, or Firm* — Buchanan Ingersoll & Rooney PC

(57) ABSTRACT

A method for updating a user service platform based on product data in a user payment transaction includes: storing an account profile, the account profile including data related to a user including a user identifier and platform data associated with a user service platform; receiving a transaction message related to a payment transaction, the transaction message being formatted pursuant to one or more standards and including a plurality of data elements and at least one of: an addendum and one or more data elements configured to store product data associated with one or more products purchased in the related payment transaction; generating a data message including data associated with the product data included in the received transaction message; and electronically transmitting the generated data message to the user service platform based on the platform data included in the account profile.

16 Claims, 8 Drawing Sheets

(56) References Cited

U.S. PATENT DOCUMENTS

| | | | | |
|---|---|---|---|---|
| 8,413,905 B2* | 4/2013 | Pourfallah | G06F 19/328 | 235/492 |
| 8,504,423 B2* | 8/2013 | Rotbard | G06Q 20/20 | 705/14.49 |
| 8,690,578 B1* | 4/2014 | Nusbaum | G09B 19/00 | 434/127 |
| 8,756,168 B1* | 6/2014 | Jayaram | G06Q 50/01 | 705/1.1 |
| 8,788,284 B2* | 7/2014 | Smith | G06Q 40/02 | 705/3 |
| 9,393,460 B1* | 7/2016 | Emigh | A63B 24/0062 | |
| 9,589,266 B2* | 3/2017 | Pourfallah | G06Q 20/3276 | |
| 9,710,822 B2* | 7/2017 | Berland | G06Q 20/405 | |
| 9,811,810 B1* | 11/2017 | Ranganath | G06Q 20/0453 | |
| 9,818,093 B1* | 11/2017 | Grier | G06Q 20/322 | |
| 9,818,153 B1* | 11/2017 | Nickel | G06Q 40/00 | |
| 2002/0027164 A1* | 3/2002 | Mault | G06F 19/00 | 235/462.46 |
| 2004/0133474 A1* | 7/2004 | Tami | G06Q 20/20 | 705/16 |
| 2004/0181453 A1* | 9/2004 | Ray | G06Q 20/20 | 705/16 |
| 2004/0260607 A1* | 12/2004 | Robbins | G06Q 20/20 | 705/14.32 |
| 2005/0027606 A1* | 2/2005 | Pearson | G06Q 30/02 | 705/26.1 |
| 2005/0043968 A1* | 2/2005 | Sauerwald | G06F 19/321 | 705/2 |
| 2005/0049920 A1* | 3/2005 | Day | G06Q 30/06 | 705/15 |
| 2007/0005416 A1* | 1/2007 | Jackson | G06Q 30/02 | 705/14.15 |
| 2008/0228582 A1* | 9/2008 | Fordyce | G06Q 30/02 | 705/14.27 |
| 2009/0087819 A1* | 4/2009 | Adachi | G06Q 30/02 | 434/127 |
| 2009/0099873 A1* | 4/2009 | Kurple | G06F 19/3475 | 705/3 |
| 2010/0057621 A1* | 3/2010 | Faith | G06F 21/602 | 705/71 |
| 2010/0100484 A1* | 4/2010 | Nguyen | G06Q 20/10 | 705/44 |
| 2010/0185461 A1* | 7/2010 | Broeska | G06Q 30/06 | 705/3 |
| 2010/0211498 A1* | 8/2010 | Aabye | G06Q 20/10 | 705/39 |
| 2010/0228561 A1* | 9/2010 | Boyce | G06F 19/3481 | 705/2 |
| 2010/0332403 A1* | 12/2010 | Angell | G06Q 10/30 | 705/308 |
| 2011/0022463 A1* | 1/2011 | Harris | G06Q 20/04 | 705/14.51 |
| 2011/0087530 A1* | 4/2011 | Fordyce, III | G06Q 10/00 | 705/14.17 |
| 2011/0093327 A1* | 4/2011 | Fordyce, III | G06Q 20/10 | 705/14.39 |
| 2011/0119130 A1* | 5/2011 | Agan | G06Q 10/10 | 705/14.49 |
| 2011/0145081 A1* | 6/2011 | Tomchek | G06Q 30/02 | 705/21 |
| 2011/0173060 A1* | 7/2011 | Gallagher | G06Q 20/0425 | 705/14.27 |
| 2012/0084135 A1* | 4/2012 | Nissan | G06Q 30/0238 | 705/14.38 |
| 2012/0101881 A1* | 4/2012 | Taylor | G06Q 20/12 | 705/14.13 |
| 2012/0209749 A1* | 8/2012 | Hammad | G06Q 30/06 | 705/27.1 |
| 2012/0229624 A1* | 9/2012 | Calman | G06F 19/3456 | 348/135 |
| 2012/0239417 A1* | 9/2012 | Pourfallah | G06Q 50/22 | 705/2 |
| 2012/0239479 A1* | 9/2012 | Amaro | G06Q 20/102 | 705/14.23 |
| 2012/0303425 A1* | 11/2012 | Katzin | G06Q 20/027 | 705/14.4 |
| 2013/0066771 A1* | 3/2013 | Ciurea | G06Q 30/0201 | 705/39 |
| 2013/0103578 A1* | 4/2013 | Mallean | G06Q 30/02 | 705/39 |
| 2013/0132193 A1* | 5/2013 | Aihara | G06O 30/0253 | 705/14.51 |
| 2013/0159081 A1* | 6/2013 | Shastry | G06Q 30/0274 | 705/14.23 |
| 2013/0179336 A1* | 7/2013 | Lyons | G06Q 20/30 | 705/39 |
| 2013/0191213 A1* | 7/2013 | Beck | G06Q 30/0267 | 705/14.53 |
| 2013/0196297 A1* | 8/2013 | Anwar | G06F 19/3475 | 434/236 |
| 2013/0226729 A1* | 8/2013 | Reed | G06Q 30/0631 | 705/26.7 |
| 2014/0025461 A1* | 1/2014 | Knowles | G06Q 30/0222 | 705/14.23 |
| 2014/0032259 A1* | 1/2014 | LaFever | G06Q 30/0201 | 705/7.29 |
| 2014/0074675 A1* | 3/2014 | Calman | G06Q 40/12 | 705/35 |
| 2014/0081750 A1* | 3/2014 | Hosp | G06Q 30/0207 | 705/14.53 |
| 2014/0081844 A1* | 3/2014 | Hosp | G06Q 20/02 | 705/39 |
| 2014/0180826 A1* | 6/2014 | Boal | G06Q 30/0245 | 705/14.66 |
| 2014/0222636 A1* | 8/2014 | Cheng | G06Q 50/01 | 705/35 |
| 2014/0351033 A1* | 11/2014 | Azevedo | G06Q 30/0222 | 705/14.19 |
| 2014/0379361 A1* | 12/2014 | Mahadkar | G06F 19/328 | 705/2 |
| 2015/0006529 A1* | 1/2015 | Kneen | G06F 17/30864 | 707/736 |
| 2015/0073907 A1* | 3/2015 | Purves | G06Q 20/32 | 705/14.58 |
| 2015/0081465 A1* | 3/2015 | Dyment | G06Q 30/0601 | 705/26.1 |
| 2015/0088715 A1* | 3/2015 | Votaw | G06Q 50/01 | 705/35 |
| 2015/0088717 A1* | 3/2015 | Votaw | G06Q 50/01 | 705/35 |
| 2015/0100467 A1* | 4/2015 | Blackhurst | G06Q 40/12 | 705/30 |
| 2015/0106243 A1* | 4/2015 | Blackhurst | G06Q 40/12 | 705/30 |
| 2015/0120378 A1* | 4/2015 | Arden | G06Q 30/02 | 705/7.29 |
| 2015/0127367 A1* | 5/2015 | Sexton | G06F 19/328 | 705/2 |
| 2015/0127476 A1* | 5/2015 | Skiba | G06Q 20/204 | 705/17 |
| 2015/0206262 A1* | 7/2015 | Pinsonneault | G06Q 50/22 | 705/2 |
| 2015/0235194 A1* | 8/2015 | Rashid | G06Q 20/202 | 705/21 |
| 2015/0242753 A1* | 8/2015 | Yarlagadda | G06Q 30/0631 | 705/26.7 |
| 2015/0286800 A1* | 10/2015 | Kanagala | G06F 19/3418 | 705/2 |
| 2015/0371553 A1* | 12/2015 | Vento | G09B 19/0092 | 434/127 |
| 2016/0133140 A1* | 5/2016 | King | G06Q 40/12 | 434/127 |
| 2016/0140296 A1* | 5/2016 | Quinn | G06Q 50/24 | 705/2 |
| 2016/0148317 A1* | 5/2016 | Benway | G06Q 40/08 | 705/2 |
| 2016/0239839 A1* | 8/2016 | Dillard | G06Q 20/0453 | |
| 2017/0039336 A1* | 2/2017 | Bitran | A61B 5/6801 | |

(56) References Cited

U.S. PATENT DOCUMENTS

| | | | |
|---|---|---|---|
| 2017/0048348 A1* | 2/2017 | Chen | H04L 67/306 |
| 2017/0083877 A1* | 3/2017 | Dix | G06Q 20/085 |
| 2017/0103677 A1* | 4/2017 | Bhattacharjee | G06Q 30/02 |
| 2017/0165526 A1* | 6/2017 | Bakun | G06Q 30/0279 |
| 2017/0235786 A9* | 8/2017 | Faith | G06Q 30/0631 |
| | | | 707/607 |
| 2018/0075420 A1* | 3/2018 | Barnett | G06Q 30/0207 |

\* cited by examiner

METHOD AND SYSTEM FOR PLATFORM DATA UPDATING BASED ON ELECTRONIC TRANSACTION PRODUCT DATA

FIELD

The present disclosure relates to the updating of a user service platform based on electronic transaction product data, specifically the capturing of product data for products purchased in an electronic payment transaction for association with a user in a user services platform.

BACKGROUND

As individuals begin to use computing devices more and more during daily activities, service providers often seek ways to benefit the daily activities of individuals through their computing devices. These service providers may make application programs available to individuals via their computing devices, such as by direct installation on the computing device or by making an application program remotely accessible, such as via cloud computing. These application programs are often designed to assist individuals with daily activities, such as tracking exercise, eating habits, dietary restrictions, budgeting, etc.

However, while these application programs are often designed with convenience of the individual in mind, many of the platforms offered by these service providers require the submission of information by the individual. For example, application programs designed to help an individual track their caloric intake often require the individual to manually log the food items they eat, such as by manual data entry of product information or the scanning of a universal product code encoded with product information that is then used to identify additional product data. Unfortunately, this may be both inconvenient and time consuming for individuals, which may result in lower usage and adoption rates, which may be detrimental to service providers of these platforms, as well as the individuals themselves who miss out on the benefits offered by these platforms.

Thus, there is a need for a technical solution to automatically provide product data and information to a service platform with minimal participation by the individual. For instance, the product information is often captured at a point of sale device of a merchant where the products are purchased. By improving technological systems to enable the transmission of this product data as part of the associated payment transaction, and association of the product data with an individual of a service platform, the product information may be automatically made available to the service platform as a result of an electronic transaction involving the individual, thus greatly increasing the effectiveness and efficiency of service platforms in providing valuable services to individuals.

SUMMARY

The present disclosure provides a description of systems and methods for updating a user service platform based on product data in a user payment transaction.

A method for updating a user service platform based on product data in a user payment transaction includes: storing, in an account database of a processing server, an account profile, wherein the account profile includes data related to a user including at least a user identifier and platform data associated with a user service platform; receiving, by a receiving device of the processing server, a transaction message related to a payment transaction, wherein the transaction message is formatted pursuant to one or more standards and includes a plurality of data elements configured to store data associated with the related payment transaction and further including at least one of: an addendum and one or more data elements configured to store product data associated with one or more products purchased in the related payment transaction; receiving, by the receiving device of the processing server, the user identifier; generating, by a processing device of the processing server, a data message, wherein the data message includes data associated with the product data included in the received transaction message; and electronically transmitting, by a transmitting device of the processing server, the generated data message to the user service platform based on the platform data included in the account profile.

A system for updating a user service platform based on product data in a user payment transaction includes an account database, a receiving device, a processing device, and a transmitting device of a processing server. The account database of the processing server is configured to store an account profile, wherein the account profile includes data related to a user including at least a user identifier and platform data associated with a user service platform. The receiving device of the processing server is configured to: receive a transaction message related to a payment transaction, wherein the transaction message is formatted pursuant to one or more standards and includes a plurality of data elements configured to store data associated with the related payment transaction and further including at least one of: an addendum and one or more data elements configured to store product data associated with one or more products purchased in the related payment transaction; and receive the user identifier. The processing device of the processing server is configured to generate a data message, wherein the data message includes data associated with the product data included in the received transaction message. The transmitting device of the processing server is configured to electronically transmit the generated data message to the user service platform based on the platform data included in the account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
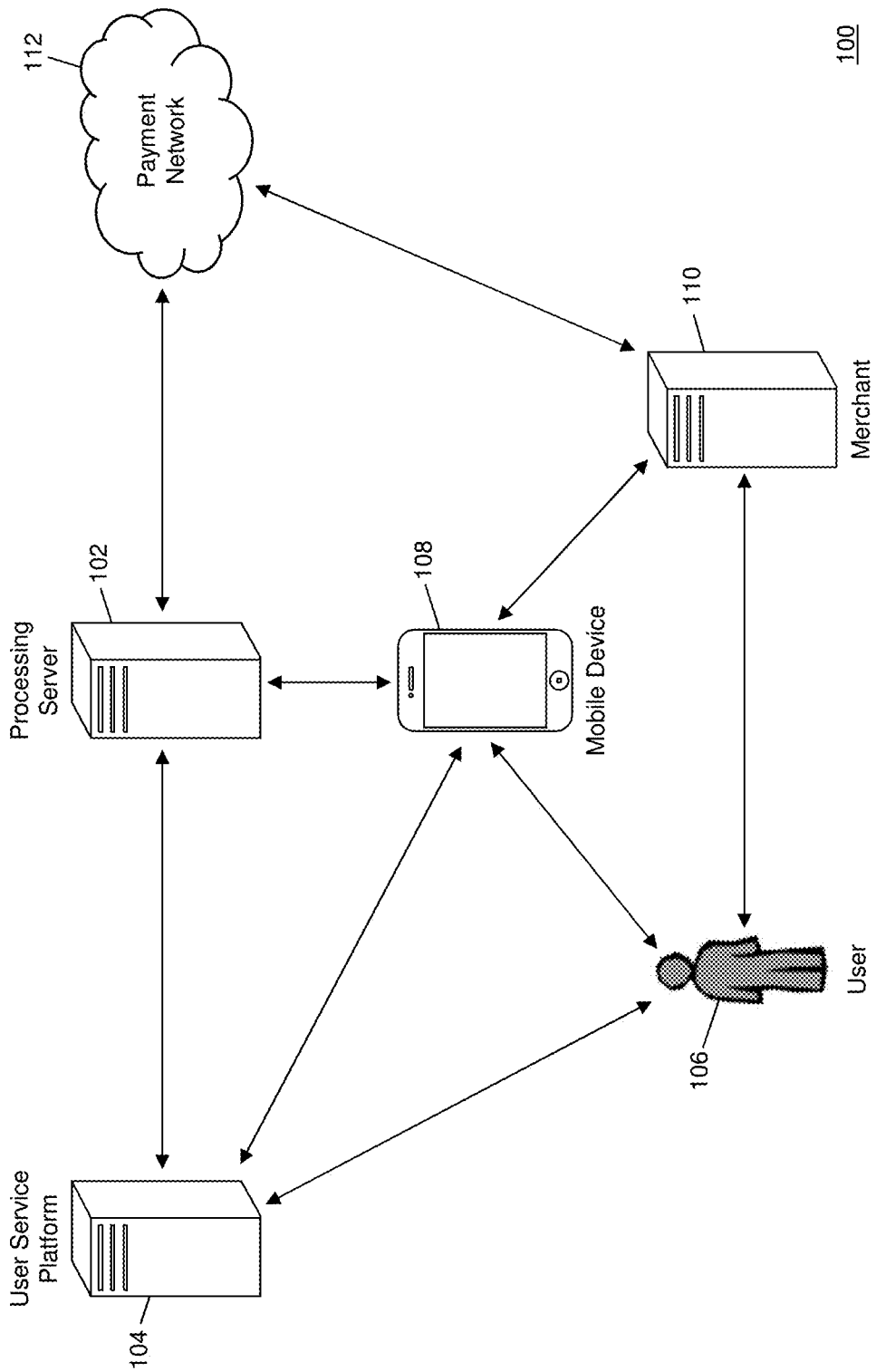
FIG. 1 is a block diagram illustrating a high level system architecture for the updating of a user service platform based on captured product data in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Capturing of Product Data for Updating a User Service Platform

FIG. 1 illustrates a system 100 for the updating of a user service platform using product data captured in an electronic payment transaction.

The system 100 may include a processing server 102. The processing server 102, discussed in more detail below, may be a computing device or system of one or more computing devices configured to provide product data captured in an electronic transaction to a user service platform 104 for the updating of a user profile thereof. The user service platform 104 may reside on one or more computing devices or systems comprised thereof at or associated with a service provider. The user service platform 104 may be configured to provide one or more users 106 with a service, such as for assistance in budgeting, monitoring eating habits, complying with dietary restrictions, tracking exercise, and other services that will be apparent to persons having skill in the relevant art.

The user service platform 104 may be accessible to users 106 via one or more computing devices, such as a mobile device 108. The computing devices may be any type of computing device suitable for accessing a user service platform 104, such as a desktop computer, laptop computer, notebook computer, tablet computer, cellular phone, smart phone, smart watch, smart television, wearable computing device, implantable computing device, etc. In some embodiments, the mobile device 108 or other computing device may be configured to execute an application program stored thereon that is associated with the user service platform 104, such as may send and receive data to and from the user service platform 104 using a suitable communication network, such as a cellular communication network or the Internet. In such instances, the mobile device 108 may receive the application program from the user service platform 104 and/or data associated therewith, may store the application program in memory and other data stored included therein, and may subsequently executed the stored application program. In other embodiments, an application program may be stored external to the mobile device 108 by or on behalf of the user service platform 104 and may be accessed remotely by the mobile device 108 via the communication network, such as using cloud computing techniques that will be apparent to persons having skill in the relevant art.

The processing server 102 may be configured to provide product data for electronic transactions involving a user 106 to the user service platform 104 for the providing of additional services by the user service platform 104 and convenience to the user 106. In some embodiments, the user 106 may register directly with the processing server 102 for the service, such as via the mobile device 108. In such embodiments, the user 106 may select one or more transaction accounts to be used for which product data is to be captured and provided to the user service platform 104 for updating of the user's user service profile. The user 106 may input transaction account information, such as account identifiers (e.g., registration numbers, usernames, e-mail addresses, phone numbers, device identifiers, primary account numbers, etc.), for each transaction account into the mobile device 108. The mobile device 108 may generate a data signal superimposed with the account identifiers and any other registration information and electronically transmit the data signal to the processing server 102 using a suitable communication network and the communication protocols associated thereto. The processing server 102 may receive the data signal, parse the data signal to obtain the data superimposed thereon (e.g., by deconstructing the data signal into data elements storing the data), and generate an account profile for the user 106, discussed in more detail below.

In some instances, account profiles may be generated for users 106 based on data provided by the user service platform 104. For example, the user service platform 104 may electronically transmit data signals superimposed with information associated with user accounts for use in registration users 106 for the providing of product data. In such an example, the user 106 may register with the user service platform 104 by providing an account identifier, which may be electronically transmitted to the processing server 102 and used in the generation of an account profile. In some instances, the account identifier may be associated with a transaction account used by the user 106 in conducting electronic payment transactions. In other instances, the account identifier may be associated with the user's account with the user service platform 104.

In the system 100, the user 106 may conduct an electronic payment transaction with a merchant 110. The electronic payment transaction may be an in-person transaction, such as where the user 106 may visit a physical location of the merchant 110, or a remote transaction, such as conducted via telephone, mail order, the Internet, etc. As part of the payment transaction, the user 106 may provide payment details for a transaction account used to fund the payment transaction to a point of sale device or other computing system of the merchant 110. Payment details may be provided, for example, by presenting a payment card encoded with payment details to a point of sale device configured to read payment details (e.g., via a magnetic stripe, integrated circuit chip, near field communication, etc.), by presenting a mobile device 108 that includes an electronic wallet application program to the point of sale device configured to receive payment details from the mobile device 108, manual entry of payment details into a computing device (e.g., the mobile device 108) for electronic transmission to the point of sale system of the merchant 110 via a communication network, such as the Internet for an e-commerce transaction, and other suitable method.

The merchant 110 may receive the payment details. In some embodiments, the payment details may include an account identifier used in registration with the processing server 102 for the providing of the service discussed herein. The merchant 110 may also receive and store product data for one or more products being purchased by the user 106 in the payment transaction. Product data may be read by a point of sale device of the merchant 110, such as using a reading device configured to read product data encoded in machine-readable code, manually input into a point of sale device of the merchant 110, such as by an employee, electronically transmitted to a point of sale device of the merchant 110, such as via an data signal superimposed with the product data electronically transmitted from a computing device of the user 106, or other suitable method.

The computing system of the merchant 110 may include the product data and payment details, as well as any other data associated with the payment transaction (e.g., transaction amount, transaction time and/or date, geographic location, consumer data, merchant data, offer data, reward data, loyalty data, etc.), in transaction data that is submitted to a payment network 112 for processing. The payment network 112 may then process the payment transaction using traditional methods and systems, such as discussed in more detail below with respect to the process 700 illustrated in FIG. 7. The transaction data may be submitted to the payment network 112 directly by the merchant 110, or by a separate entity associated with the merchant 110 to whom the transaction data is first provided, such as a gateway processor or acquiring financial institution, as discussed below.

The transaction data may be included in one or more data elements of a transaction message submitted to the payment network 112 using the payment rails. The transaction message may be a specially formatted data message that is formatted pursuant to one or more standards governing the exchange of financial transaction messages, such as the International Organization of Standardization's ISO 8583 standard. The one or more data elements included in the transaction message may be configured to store data as set forth in the associated standard(s). For example, the transaction message may include a data element configured to store a primary account number, a data element configured to store a transaction amount, a data element configured to store a transaction time, etc. The transaction message may also include additional information suitable for use in the processing of the related payment transaction, such as a message type indicator. For instance, when the transaction message is submitted to the payment network 112, the message type indicator may indicate that the transaction message is an authorization request. The transaction message may also include one or more bitmaps, which may indicate the data elements included therein and data stored in the included data elements.

The transaction message may be configured to store the product data captured by the merchant 110. In some embodiments, the product data may be stored in one or more data elements of the transaction message, such as may be specified by the associated standards, the payment network 112, the processing server 102, the merchant 110, etc. In other embodiments, the product data may be included in an addendum to the transaction message, which may be included as part of the transaction message or transmitted accompanying the transaction message, such as part of a data transmission including the transaction message or in a separate data transmission to the payment network 112. The product data may include any type of data associated with the product or products being purchased. For instance, the product data may be a product identifier (e.g., a universal product code, stock keeping unit, serial number, European article number, registration number, etc.), a product name, product description, product size, product quantity, calorie amount, calories per service, nutritional data, or any other data or a combination thereof.

Following processing of the payment transaction, the payment network 112 may electronically transmit the transaction message to the processing server 102. In some instances, the transaction message may be electronically transmitted to the processing server 102 via the payment rails associated with the payment network 112. In other instances, the transaction message may be transmitted using an alternative communication network, such as a local area network, wide area network, the Internet, a radio frequency network, etc. In some embodiments, the processing server 102 may be included as part of the payment network 112 and the transaction message transmitted to the processing server 102 using internal communication methods and protocols.

The processing server 102 may be configured to identify the user 106 associated with the payment transaction. In some embodiments, the processing server 102 may identify the user 106 via an account identifier included in a corresponding data element included in the transaction message. For example, if the user 106 or user service platform 104 provided the processing server 102 with a primary account number during registration of the user 106 for the service, the processing server 102 may identify the primary account number stored in the corresponding data element included in the transaction message and identify the user 106 and/or account profile associated thereto. In other embodiments, the processing server 102 may receive a second data signal superimposed with data indicating the user 106 associated with the received transaction message. For instance, the user 106 may submit, via the mobile device 108, a data signal to the processing server 102 superimposed with the account identifier associated with the user 106. The processing server 102 may receive and parse the data signal to obtain the account identifier and may associated with transaction message with the account identifier. In some instances, the data signal provided by the mobile device 108 may also include data identifying the transaction message, such that the correct transaction message corresponding to the payment transaction involving the user 106 may be correctly identified. Such data may include, for example, a transaction identifier, a reference number, one or more details of the payment transaction (e.g., amount, time, merchant information, etc.), etc.

Once the user 106 has been identified, the processing server 102 may parse the transaction message and/or addendum thereto to obtain the product data for the one or more products purchased by the user 106. The processing server 102 may identify account information associated with the user's account with the user service platform 104, and may generate a data message that includes at least the product data and the account information. The processing server 102 may then electronically transmit a data signal superimposed with the generated data message to the user service platform 104. The user service platform 104 may parse the data signal to obtain the data message and data included therein, and may then update the profile of the user 106 based on the product data.

In some embodiments, the user service platform 104 and/or processing server 102 may be configured to first identify additional information associated with the purchased product or products prior to updating of the user profile. For example, the product data included in the transaction message may be a product identifier. The processing server 102 or user service platform 104 may be configured to identify additional product data associated with the purchased product based on the product identifier, such as a product name, product description, and calorie amount. Such additional product data may then be used to update the user profile. In some instances, both the processing server 102 and the user service platform 104 may identify additional product data. For instance, as discussed in more detail below, the product data may include a product identifier. The processing server 102 may identify additional product information, such as a product name and description, which may be electronically transmitted to the user service platform 104. The user service platform 104 may then use the product name and description to identify further additional product information, such as a calorie amount associated with the product. In such instances, the processing server 102 and user service platform 104 may be configured to identify the product information necessary for usage by the user service platform 104, without modification to the product data capturing capabilities of systems of the merchant 110 configured to capture product data for use in payment transactions.

The methods and systems discussed herein may enable the processing server 102 to identify product data for use in updating a user service platform 104, with minimal to no modification of existing merchant and payment network systems. In addition, product data being captured at a merchant 110 (e.g., as part of a payment transaction) and automatically provided by the processing server 102 to the appropriate user service platform 104 may enable the updating of the user service platform 104 data for a user 106 without user intervention and participation, which may greatly increase the efficiency of user service platforms 104. The increase in efficiency may be even greater in instances where a user 106 is associated with multiple user service platforms 104. In such instances, the processing server 102 may be configured to provide product data to multiple user service platforms 104 for a single payment transaction or to identify a specific user service platform 104 from multiple service platforms 104 associated with a user 106 for providing product data, such as based on data included in the transaction message (e.g., merchant name, merchant industry, product data, etc.) or submitted by the user 106 via the mobile device 108 (e.g., in the data signal superimposed with the account identifier, such as information indicating the user service platform 104).

Processing Server

Figure 2:
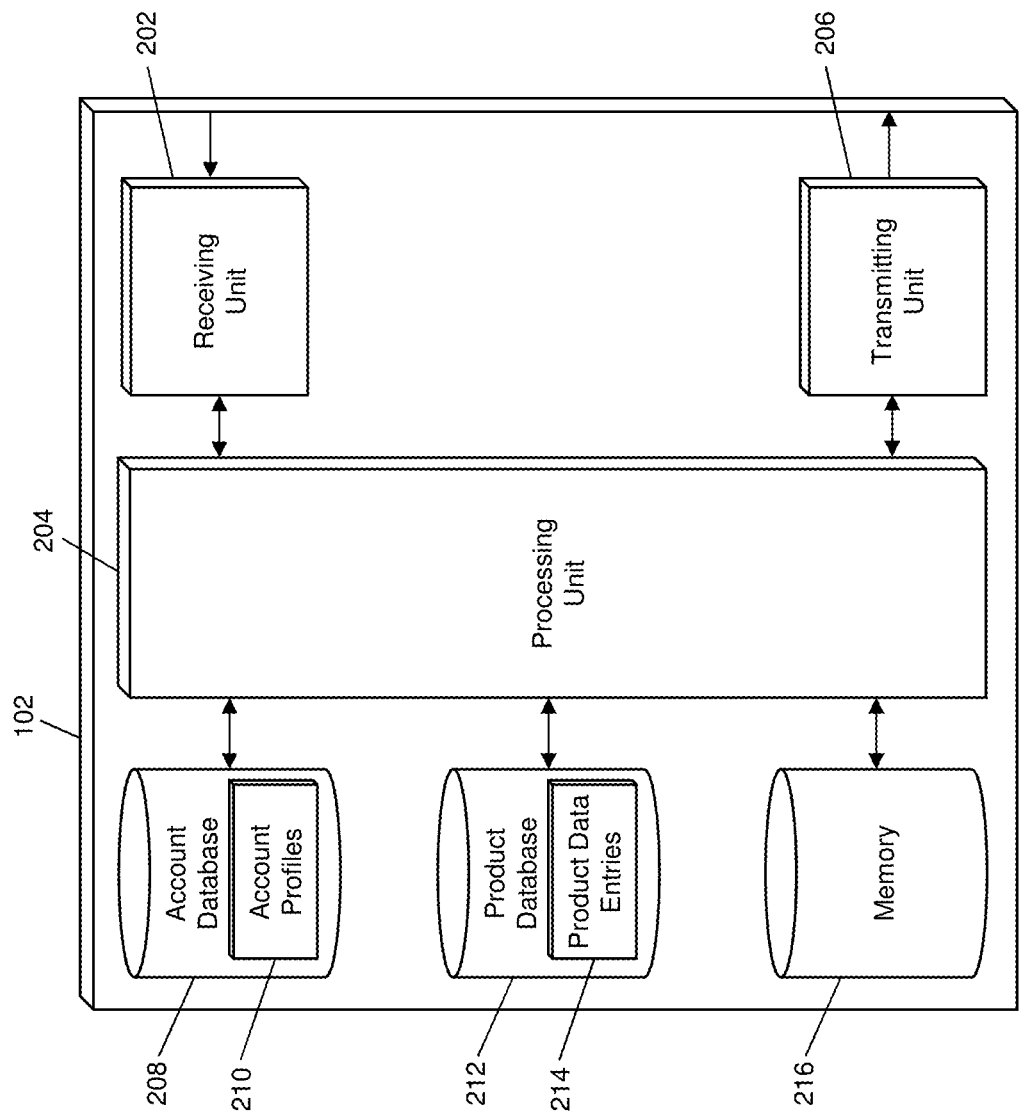
FIG. 2 is a block diagram illustrating the processing server of FIG. 1 for the updating of a user service platform using product data captured in an electronic payment transaction in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 104 for the transmission of transaction messages that include sensitive financial data and information. In some instances, the receiving unit 202 may also be configured to receive data from mobile devices 112, computing devices, issuers 108 and other entities via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive electronically data signals that are transmitted, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon.

The receiving unit 202 may be configured to receive data signals electronically transmitted from the user service platform 104, mobile device 108, and payment network 112. Received data signals may be superimposed with data suitable for performing the functions disclosed herein, which may be parsed by a parsing module of the receiving unit 202 to obtain the data included therein. For example, the user service platform 104 and mobile device 108 may transmit data signals superimposed with registration data, which may include account identifiers and other identifying information of the user 106 that is associated with the user profile of the user service platform 104 and/or transaction accounts used by the user 106. The receiving unit 202 may also receive data signals from the mobile device 108 superimposed with account identifying information and information identifying transaction messages. The receiving unit 202 may be further configured to receive transaction messages from the payment network 112, which may be transmitted via the payment rails or other suitable communication network.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. In some instances, the processing unit 204 may include a parsing module or engine configured to parse data from data signals electronically received by the receiving unit 202, an encryption module or engine configured to decrypt received data or data signals or to encrypt data or data signals received or transmitted by the processing server 102, and any other modules suitable for performing the functions discussed herein.

The processing server 102 may also include an account database 208. The account database 208 may be configured to store a plurality of account profiles 210 using a suitable data storage format and schema. Each account profile 210 may be configured to store a standardize data set including data related to a user 106 including at least a user identifier and platform data associated with a user service platform 104. In some instances, an account profile 210 may include platform data for a plurality of different user service platforms. The user identifier may be an identification value associated with the user 106 for identification of the user 106 and/or the respective account profile 210, such as an identification number, account number, username, e-mail address, phone number, device identifier, etc. In some instances, the user identifier may be associated with a specific user service platform 104. In such instances, an account profile 210 may include a different user identifier for each associated user service platform 104. The platform data may include data suitable for use in identifying a user service platform and the transmission of a data signal thereto for the updating of a profile for the related user 106. For example, the platform data may include a platform identifier, an internet protocol address, a username, login credentials, etc.

In some embodiments, an account profile 210 may also include one or more account identifiers. Account identifiers may be identification values associated with a transaction account that may be used to fund a payment transaction involving the related user 106, such as a primary account number corresponding to the associated transaction account. Account profiles 210 may also include additional information suitable for performing the functions discussed herein, such as device identifiers (e.g., media access control address, registration number, serial number, phone number, username, etc.) associated with a mobile device 108, communication preferences, rules for providing product data to user service platforms 104, etc.

In some instances, the processing server 102 may also include a product database 212. The product database 212 may be configured to store a plurality of product data entries 214 using a suitable data storage format and schema. Each product data entry 214 may be a standardized data set that includes data related to a product, including at least a product identifier and additional product information. The product identifier may be an identification value associated with the related product, as discussed above. The additional product information may be any information associated with the related product in addition to the product identifier, such as a product name, product description, product image, product size, manufacturer data, cost, nutritional data, total calories, calories per serving, etc.

The processing unit 204 may include a querying module. The querying module may receive a query string from another module, engine, or device in the processing server 102 as an input and may be configured to execute a query on a database of the processing server 102 to output data from the database as identified according to the query. For instance, the querying module may execute a query on the account database 208 to identify an account profile 210 associated with a transaction message and/or data signal received and parsed by the receiving unit 202, such as for use in providing product data to an associated user service platform 104. The querying module may also be configured to execute queries on the product database 212 to identify product data entries 214 that include specific product identifiers, such as included in a received transaction message.

The processing unit 204 may also include a platform identification module. The platform identification module may receive a transaction message or data included therein as well as an account profile 210 as input, and may output an indication of a user service platform 104 to which product data may be provided. The platform identification module may identify a user service platform 104 based on, for example, transaction data for the transaction (e.g., transaction amount, merchant name, merchant industry, geographic location, etc.), the product data, preferences set by the user 106 and saved in the account profile 210, etc.

The processing unit 204 may also include a message generation module. The message generation module may take product data parsed from a transaction message and platform data based on an indication produced by the platform identification module as input and may generate a data message as output. The data message may include at least the product data, and may be formatted for transmission to the indicated user service platform 104. In instances where multiple user service platforms 104 may be indicated, the message generation module may be configured to generate a data message for each user service platform 104. In some instances, generated data messages may also include a user identifier, such as included in a specific account profile 210 to which the transaction message is associated, as well as additional product information identified for the product data included in the transaction message, if applicable.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 112 for the transmission of transaction messages that include sensitive financial data and information, such as identified payment credentials. In some instances, the transmitting unit 206 may be configured to transmit data to consumer devices 104, digital entities 106, third parties 108, merchants 110, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to electronically transmit data signals to user service platforms 104, such as data signals superimposed with generated data messages that include product data. The transmitting unit 206 may, in some instances, be configured to electronically transmit data signals to additional entities, such as the mobile device 108 and payment network 112. For example, the transmitting unit 206 may transmit a data signal to the mobile device 108 superimposed with data requesting account identifiers, transaction identifiers, or other data suitable for use in performing the functions disclosed herein. In another example, the transmitting unit 206 may transmit a data signal to the payment network 112 requesting a transaction message, such as in response to a request submitted by the user 106 via the mobile device 108 (e.g., and received and parsed by the receiving unit 202), that includes a transaction identifier for use in identifying a transaction message for which product data may be provided to one or more associated user service platforms 104.

The processing server 102 may also include a memory 216. The memory 216 may be configured to store data for use by the processing server 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing unit 204, and other data that may be suitable for use by the processing server 102 in the performance of the functions disclosed herein as will be apparent to persons having skill in the relevant art.

Process for Providing Product Identifiers to a User Service Platform

Figure 3:
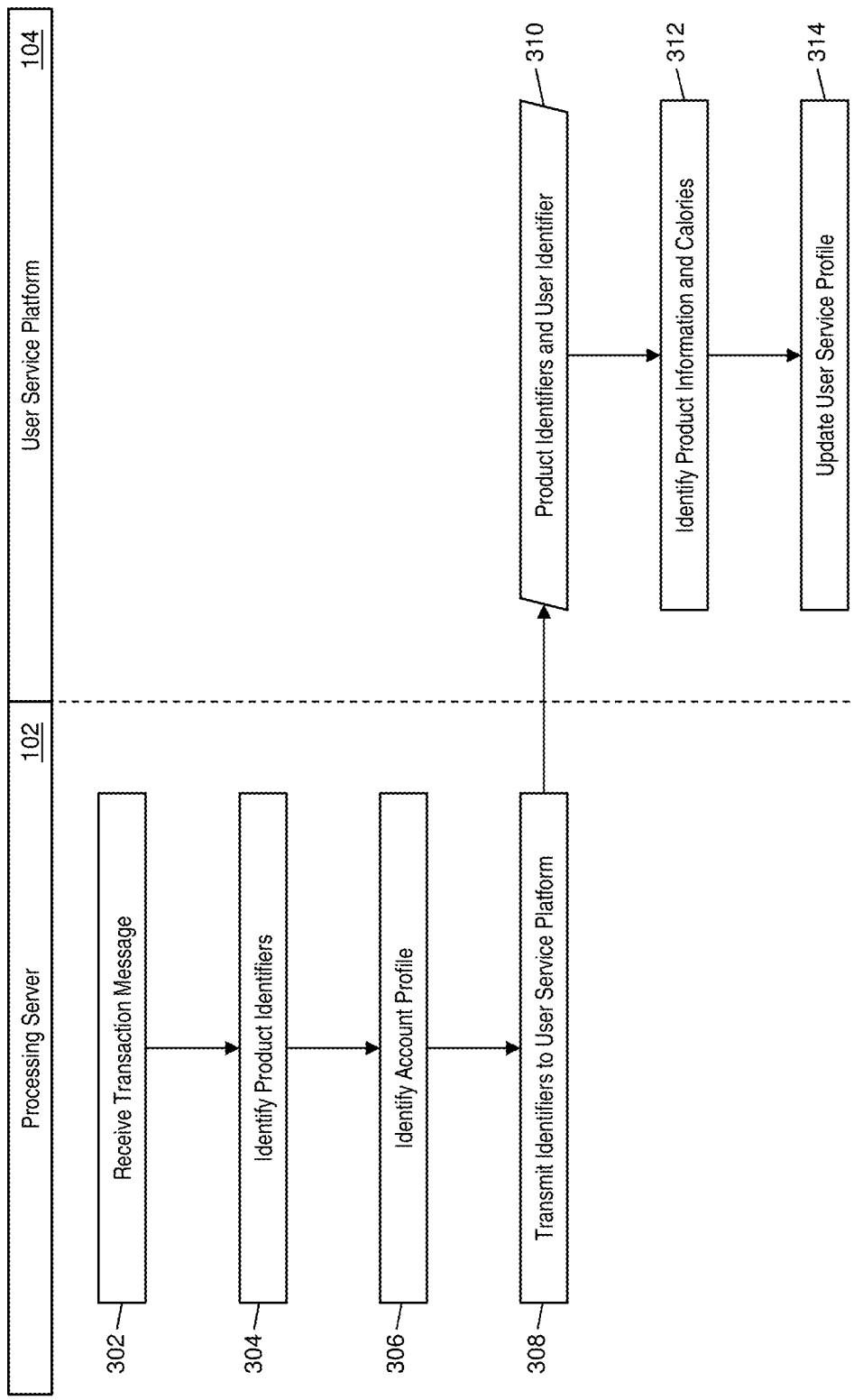
FIG. 3 is a flow diagram illustrating a process for providing product identifiers to a user service platform for products captured in an electronic payment transaction in accordance with exemplary embodiments.

FIG. 3 illustrates a process 300 for the providing of product identifiers captured in an electronic payment transaction to the user service platform 104 as part of the system 100 of FIG. 1.

In step 302, the receiving unit 202 of the processing server 102 may receive a transaction message from the payment network 112 via the payment rails. The transaction message may be formatted pursuant to one or more standards, such as the ISO 8583 standard, and include a plurality of data elements configured to store data associated with the payment transaction. The transaction may also include an addendum or one or more data elements configured to store product identifiers for one or more products purchased in the related payment transaction. In step 304, the processing unit 204 may identify the product identifiers. Identification of the product identifiers may include the parsing of the transaction message by a parsing module of the receiving unit 202 or the processing unit 204 to obtain the data elements contained therein, and the identification of the product identifiers in the addendum or corresponding one or more data elements by the processing unit 204.

In step 306, the processing unit 204 may identify a specific account profile 210 associated with a user 106 involved in the payment transaction. In some embodiments, a data element of the transaction message may include a user identifier. In such an embodiment, the querying module of the processing unit 204 may execute a query on the account database 208 to identify a specific account profile 210 that includes the user identifier parsed from the transaction message. In other embodiments, the receiving unit 202 may receive a data signal superimposed with a user identifier, such as from the mobile device 108. In such an instance, the query executed by the querying module may use the user identifier parsed from the received data signal. In some cases, the data signal may also be superimposed with a transaction identifier or other transaction data that is included in one or more of the data elements of the received transaction messages. In such a case, the processing unit 204 may include a data verification module, which may receive the transaction identifier and/or other data and data stored in the corresponding data elements of the received transaction message for verification, and may output an indication of successful or unsuccessful verification to ensure the received data signal is applied to the proper transaction message.

Once the specific account profile 210 is identified, then, in step 308, product identifiers may be transmitted to a user service platform 104. Step 308 may include the generation of a data message by the message generation module that includes at least the product identifiers identified from the transaction message and the user identifier included in the specific account profile 210, and may also include any data suitable for transmission to the user service platform 104, such as may be set forth in the platform data stored in the identified specific account profile 210. The transmitting unit 206 of the processing server 102 may electronically transmit a data signal superimposed with the generated data message to the user service platform 104. In some instances, a data message may be electronically transmitted to multiple user service platforms 104, such as may be specified in the specific account profile 210.

In step 310, the user service platform 104 may receive the product identifiers and user identifier. In step 312, the user service platform 104 may use the product identifiers to identify additional product information and calorie data for the one or more products, such as by querying a product database to identify product information and calorie data in product data entries that include the product identifiers. In step 314, the user service platform 104 may update a user profile for the user 106 accordingly, where the user profile may be identified using the user identifier and the profile updated based on the identified product information and calorie data.

Process for Providing Product Information to a User Service Platform

Figure 4:
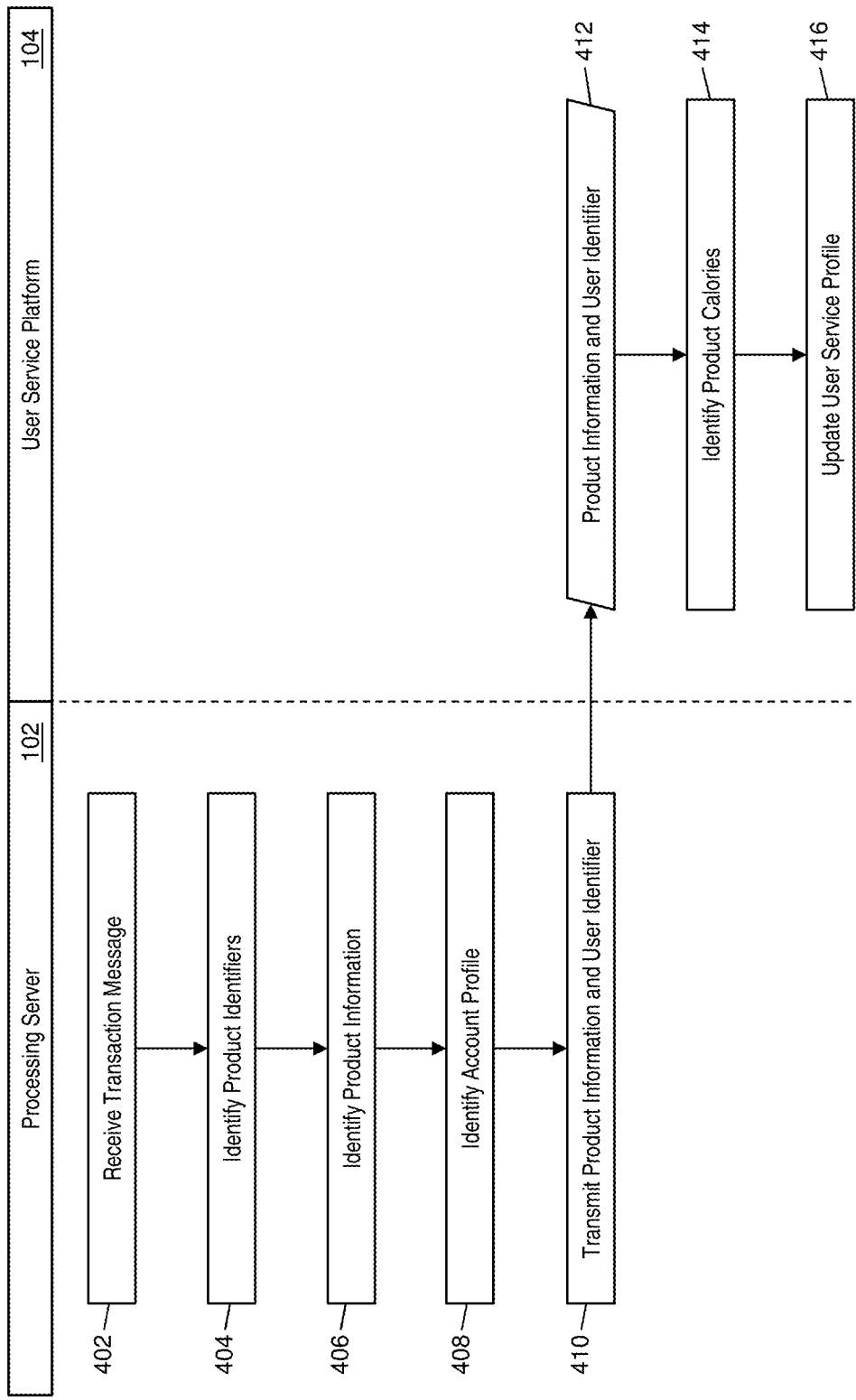
FIG. 4 is a flow diagram illustrating a process for providing product information to a user service platform for products captured in an electronic payment transaction in accordance with exemplary embodiments.

FIG. 4 illustrates a process 400 for the providing of product information based on product identifiers captured in an electronic payment transaction to the user service platform 104 as part of the system 100 of FIG. 1.

In step 402, the receiving unit 202 of the processing server 102 may receive a transaction message from the payment network 112 via the payment rails. The transaction message may be formatted pursuant to one or more standards, such as the ISO 8583 standard, and include a plurality of data elements configured to store data associated with the payment transaction. The transaction may also include an addendum or one or more data elements configured to store product identifiers for one or more products purchased in the related payment transaction. In step 404, the processing unit 204 may identify the product identifiers. Identification of the product identifiers may include the parsing of the transaction message by a parsing module of the receiving unit 202 or the processing unit 204 to obtain the data elements contained therein, and the identification of the product identifiers in the addendum or corresponding one or more data elements by the processing unit 204.

In step 406, the querying module of the processing unit 204 may execute a query on the product database 212 of the processing server 102 to identify a product data entry 214 for each product identifier identified from the received transaction message that includes the respective product identifier. Each identified product data entry 214 may include additional product information associated with the related product. In step 408, the processing unit 204 may identify a specific account profile 210 associated with a user 106 involved in the payment transaction. In some embodiments, a data element of the transaction message may include a user identifier. In such an embodiment, the querying module of the processing unit 204 may execute a query on the account database 208 to identify a specific account profile 210 that includes the user identifier parsed from the transaction message. In other embodiments, the receiving unit 202 may receive a data signal superimposed with a user identifier, such as from the mobile device 108. In such an instance, the query executed by the querying module may use the user identifier parsed from the received data signal. In some cases, the data signal may also be superimposed with a transaction identifier or other transaction data that is included in one or more of the data elements of the received transaction messages. In such a case, the processing unit 204 may include a data verification module, which may receive the transaction identifier and/or other data and data stored in the corresponding data elements of the received transaction message for verification, and may output an indication of successful or unsuccessful verification to ensure the received data signal is applied to the proper transaction message.

Once the specific account profile 210 is identified, then, in step 410, product information may be transmitted to a user service platform 104. Step 410 may include the generation of a data message by the message generation module that includes at least the product information identified from the product data entries 214 identified using the product identifiers from the received transaction message and the user identifier included in the specific account profile 210, and may also include any data suitable for transmission to the user service platform 104, such as may be set forth in the platform data stored in the identified specific account profile 210. The transmitting unit 206 of the processing server 102 may electronically transmit a data signal superimposed with the generated data message to the user service platform 104. In some instances, a data message may be electronically transmitted to multiple user service platforms 104, such as may be specified in the specific account profile 210.

In step 412, the user service platform 104 may receive the product information and user identifier. In step 414, the user service platform 104 may use the product information to identify calorie data for the one or more products, such as by querying a product database to identify calorie data in product data entries that include the product information, such as product name, product size, product quantity, etc. In step 416, the user service platform 104 may update a user profile for the user 106 accordingly, where the user profile may be identified using the user identifier and the profile updated based on the identified calorie data.

Process for Providing Product Caloric Data to a User Service Platform

Figure 5:
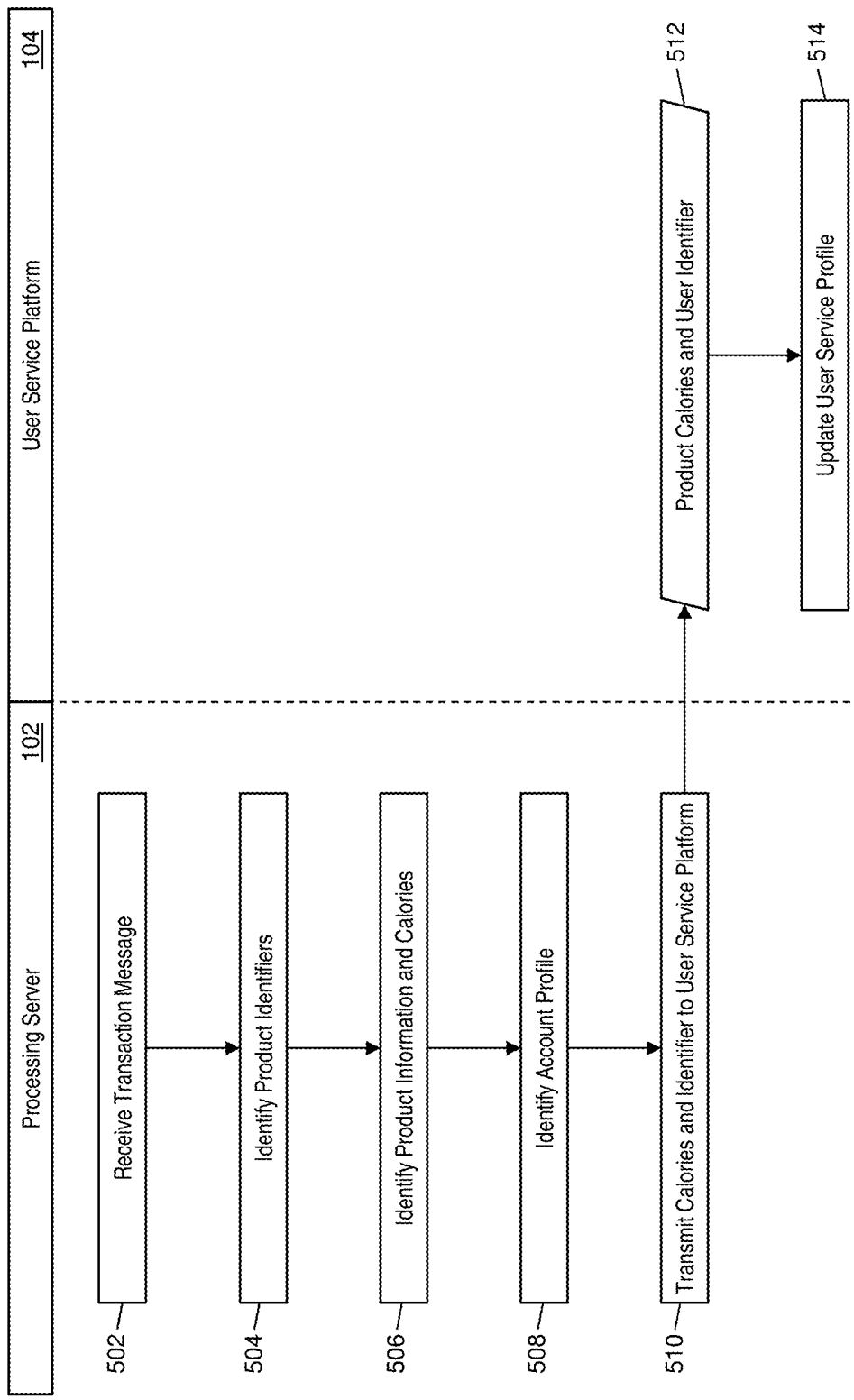
FIG. 5 is a flow diagram illustrating a process for providing detailed product data to a user service platform for products captured in an electronic payment transaction in accordance with exemplary embodiments.

FIG. 5 illustrates a process 500 for the providing of product information based on product identifiers captured in an electronic payment transaction to the user service platform 104 as part of the system 100 of FIG. 1.

In step 502, the receiving unit 202 of the processing server 102 may receive a transaction message from the payment network 112 via the payment rails. The transaction message may be formatted pursuant to one or more standards, such as the ISO 8583 standard, and include a plurality of data elements configured to store data associated with the payment transaction. The transaction may also include an addendum or one or more data elements configured to store product identifiers for one or more products purchased in the related payment transaction. In step 504, the processing unit 204 may identify the product identifiers. Identification of the product identifiers may include the parsing of the transaction message by a parsing module of the receiving unit 202 or the processing unit 204 to obtain the data elements contained therein, and the identification of the product identifiers in the addendum or corresponding one or more data elements by the processing unit 204.

In step 506, the querying module of the processing unit 204 may execute a query on the product database 212 of the processing server 102 to identify a product data entry 214 for each product identifier identified from the received transaction message that includes the respective product identifier. Each identified product data entry 214 may include additional product information associated with the related product and calorie data associated with the related product. A caloric identification module of the processing unit 204 may receive the additional product information and calorie data as input and may output a calorie amount for each product, such as based on size, quantity, and other relevant product information.

In step 508, the processing unit 204 may identify a specific account profile 210 associated with a user 106 involved in the payment transaction. In some embodiments, a data element of the transaction message may include a user identifier. In such an embodiment, the querying module of the processing unit 204 may execute a query on the account database 208 to identify a specific account profile 210 that includes the user identifier parsed from the transaction message. In other embodiments, the receiving unit 202 may receive a data signal superimposed with a user identifier, such as from the mobile device 108. In such an instance, the query executed by the querying module may use the user identifier parsed from the received data signal. In some cases, the data signal may also be superimposed with a transaction identifier or other transaction data that is included in one or more of the data elements of the received transaction messages. In such a case, the processing unit 204 may include a data verification module, which may receive the transaction identifier and/or other data and data stored in the corresponding data elements of the received transaction message for verification, and may output an indication of successful or unsuccessful verification to ensure the received data signal is applied to the proper transaction message.

Once the specific account profile 210 is identified, then, in step 510, product information may be transmitted to a user service platform 104. Step 510 may include the generation of a data message by the message generation module that includes at least the calorie data identified from the product data entries 214 and caloric identification module identified using the product identifiers from the received transaction message and the user identifier included in the specific account profile 210, and may also include any data suitable for transmission to the user service platform 104, such as may be set forth in the platform data stored in the identified specific account profile 210. The transmitting unit 206 of the processing server 102 may electronically transmit a data signal superimposed with the generated data message to the user service platform 104. In some instances, a data message may be electronically transmitted to multiple user service platforms 104, such as may be specified in the specific account profile 210.

In step 512, the user service platform 104 may receive the calorie data and user identifier. In step 514, the user service platform 104 may update a user profile for the user 106 accordingly, where the user profile may be identified using the user identifier and the profile updated based on the calorie data superimposed in the data signal electronically transmitted by the processing server 102.

Figure 6:
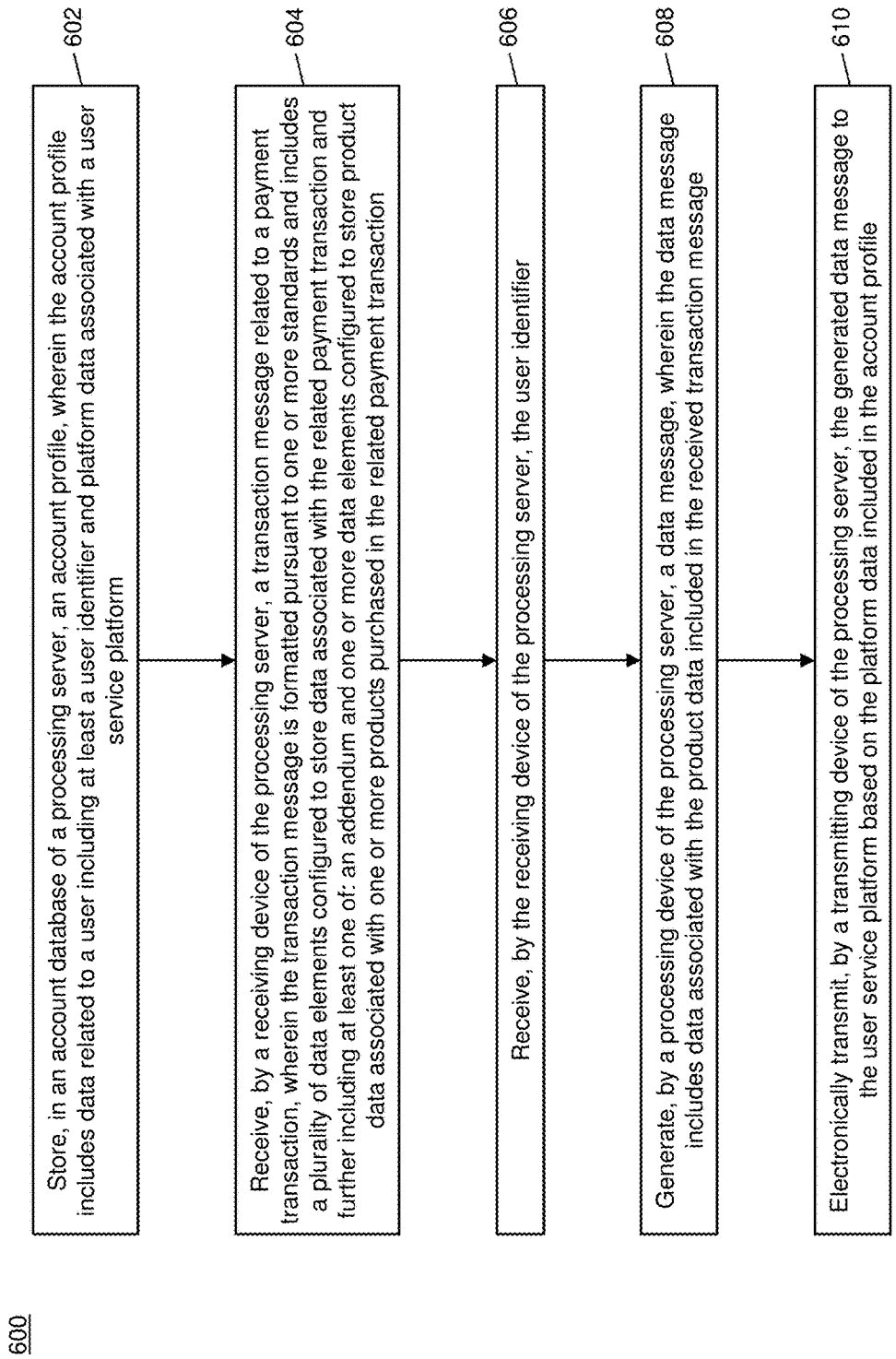
FIG. 6 is a flow chart illustrating an exemplary method for updating a user service platform based on product data in a user payment transaction in accordance with exemplary embodiments.

Exemplary Method for Updating a User Service Platform Based on Product Data in a User Payment Transaction FIG. 6 illustrates a method 600 for the updating of a user service platform based on product data that is captured in an addendum or data elements of a transaction message related to an electronic payment transaction.

In step 602, an account profile (e.g., account profile 210) may be stored in an account database (e.g., the account database 208) of a processing server (e.g., the processing server 102), wherein the account profile includes data related to a user (e.g., the user 106) including at least a user identifier and platform data associated with a user service platform (e.g., user service platform 104). In step 604, a transaction message related to a payment transaction may be received by a receiving device (e.g., the receiving unit 202) of the processing server, wherein the transaction messages is formatted pursuant to one or more standards and includes a plurality of data elements configured to store data associated with the related payment transaction and further including at least one of: an addendum and one or more data elements configured to store product data associated with one or more products purchased in the related payment transaction.

In step 606, the receiving device of the processing server may receive a user identifier. In step 608, a data message may be generated by a processing device (e.g., the processing unit 204) of the processing server, wherein the data message includes data associated with the product data included in the received transaction message. In step 610, the generated data message may be electronically transmitted by a transmitting device (e.g., the transmitting unit 206) of the processing server to the user service platform based on the platform data included in the account profile.

In one embodiment, the user identifier may be included in one of: the addendum and a data element of the plurality of data elements included in the received transaction message. In another embodiment, the user identifier may be included in a data transmission transmitted separate from the received transaction message. In a further embodiment, the data transmission may be transmitted from a mobile computing device (e.g., the mobile device 108) associated with the user service platform, and wherein the user identifier is associated with the mobile computing device.

In some embodiments, the product data may comprise a product identifier for each of the associated one or more products. In a further embodiment, the method 600 may also include: storing, in a product database (e.g., the product database 212), a plurality of product data entries (e.g., product data entries 214), wherein each product data entry includes data related to a product including at least a product identifier and product information; and executing, by the processing device of the processing server, a query on the product database to identify a product data entry for each of the one or more products where the product data entry includes the associated product identifier, wherein the data associated with the product data included in the received transaction message included in the generated data message comprises the product information included in each identified product data entry. In an even further embodiment, the product information may include at least one of: product name, product brand, product size, product servings, and calories per serving.

In one embodiment, the data associated with the product data included in the received transaction message included in the generated data message may comprise the product data. In some embodiments, the one or more products may be food products. In one embodiment, one data element of the plurality of data elements may be configured to store a transaction data, wherein the generated data message further includes the transaction date.

Payment Transaction Processing System and Process

Figure 7:
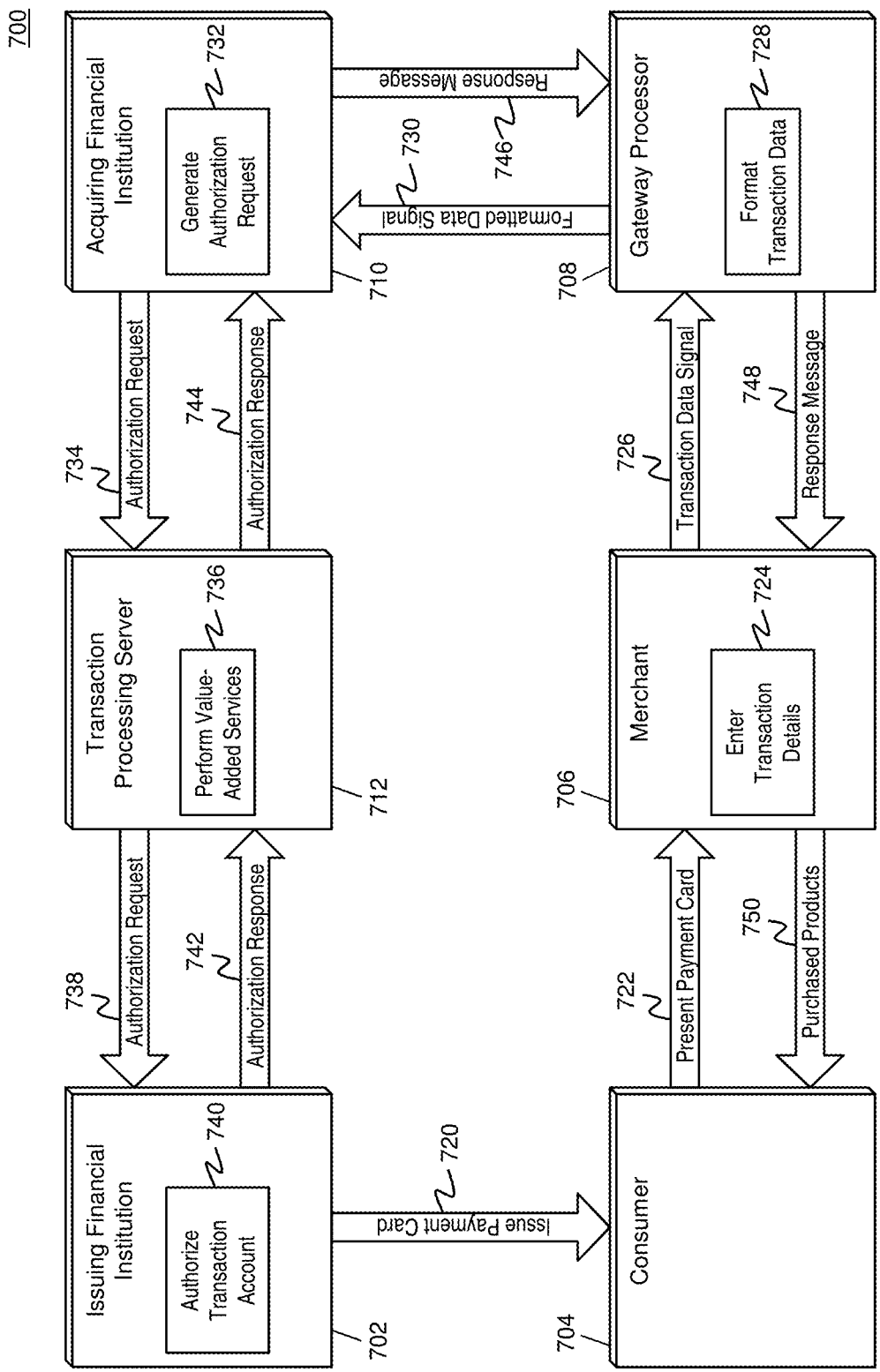
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the user 106, merchant 110, processing server 102, and payment network 112. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 704 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 508 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 740 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
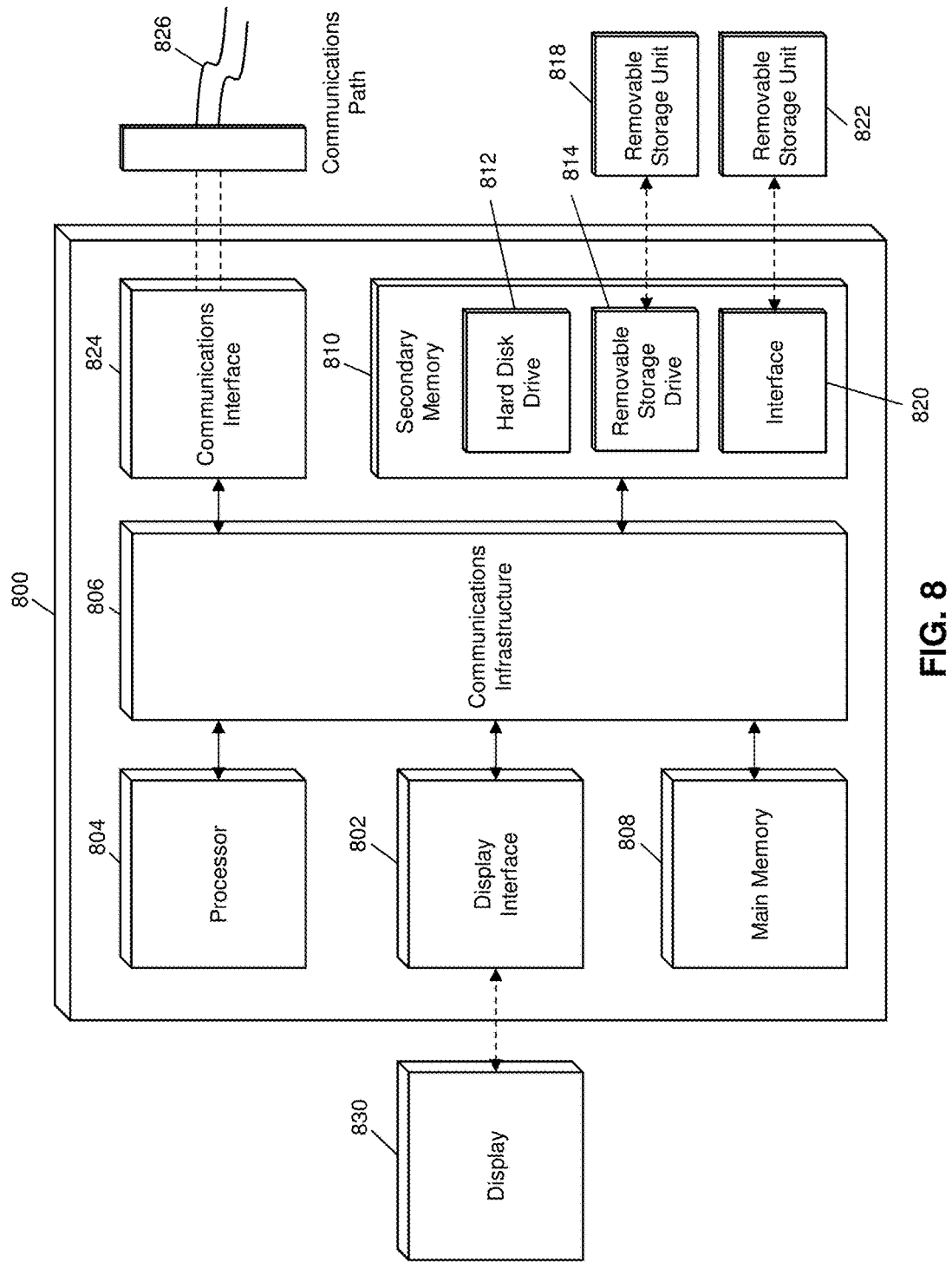
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for the updating of user service platforms based on product data captured in electronic payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for updating a user service platform based on product data in a user payment transaction, comprising:
    storing, in an account database of a processing server, an account profile, wherein the account profile includes data related to a user including at least a user identifier and platform data associated with a user service platform;
    storing, in a product database of the processing server, a plurality of product data entries, wherein each product data entry includes data related to a product including at least a product identifier and product information;
    receiving, by a receiving device of the processing server, a transaction message related to a payment transaction, wherein the transaction message is formatted pursuant to one or more standards and includes a plurality of data elements configured to store data associated with the related payment transaction and further including at least one of: an addendum and one or more data elements configured to store product data associated with one or more products purchased in the related payment transaction, where the product data comprises a product identifier for each of the associated one or more products;
    receiving, by the receiving device of the processing server, the user identifier;
    executing, by the processing device of the processing server, a query on the product database to identify a product data entry for each of the one or more products where the product data entry includes the associated product identifier;
    generating, by a processing device of the processing server, a data message, wherein the data message includes the product information included in each identified product data entry; and
    electronically transmitting, by a transmitting device of the processing server, the generated data message to the user service platform based on the platform data included in the account profile.

2. The method of claim 1, wherein the user identifier is included in one of: the addendum and a data element of the plurality of data elements included in the received transaction message.

3. The method of claim 1, wherein the user identifier is included in a data transmission transmitted separate from the received transaction message.

4. The method of claim 3, wherein the data transmission is transmitted from a mobile computing device associated with the user service platform, and wherein the user identifier is associated with the mobile computing device.

5. The method of claim 1, wherein the product information includes at least one of: product name, product brand, product size, product servings, and calories per serving.

6. The method of claim 1, wherein the data associated with the product data included in the received transaction message included in the generated data message comprises the product data.

7. The method of claim 1, wherein the one or more products are food products.

8. The method of claim 1, wherein one data element of the plurality of data elements is configured to store a transaction date, and wherein the generated data message further includes the transaction date.

9. A system for updating a user service platform based on product data in a user payment transaction, comprising:
    an account database of a processing server configured to store an account profile, wherein the account profile includes data related to a user including at least a user identifier and platform data associated with a user service platform;
    a product database of the processing server configured to store a plurality of product data entries, wherein each product data entry includes data related to a product including at least a product identifier and product information;
    a receiving device of the processing server configured to receive a transaction message related to a payment transaction, wherein the transaction message is formatted pursuant to one or more standards and includes a plurality of data elements configured to store data associated with the related payment transaction and further including at least one of: an addendum and one or more data elements configured to store product data associated with one or more products purchased in the related payment transaction, where the product data comprises a product identifier for each of the associated one or more products, and
    receive the user identifier;
    a processing device of the processing server configured to execute a query on the product database to identify a product data entry for each of the one or more products where the product data entry includes the associated product identifier, and
    generate a data message, wherein the data message includes the product information included in each identified product data entry; and
    a transmitting device of the processing server configured to electronically transmit the generated data message to the user service platform based on the platform data included in the account profile.

10. The system of claim 9, wherein the user identifier is included in one of: the addendum and a data element of the plurality of data elements included in the received transaction message.

11. The system of claim 9, wherein the user identifier is included in a data transmission transmitted separate from the received transaction message.

12. The system of claim 11, wherein the data transmission is transmitted from a mobile computing device associated with the user service platform, and wherein the user identifier is associated with the mobile computing device.

13. The system of claim 9, wherein the product information includes at least one of: product name, product brand, product size, product servings, and calories per serving.

14. The system of claim 9, wherein the data associated with the product data included in the received transaction message included in the generated data message comprises the product data.

15. The system of claim 9, wherein the one or more products are food products.

16. The system of claim 9, wherein one data element of the plurality of data elements is configured to store a transaction date, and wherein the generated data message further includes the transaction date.

* * * * *